Figure 6:
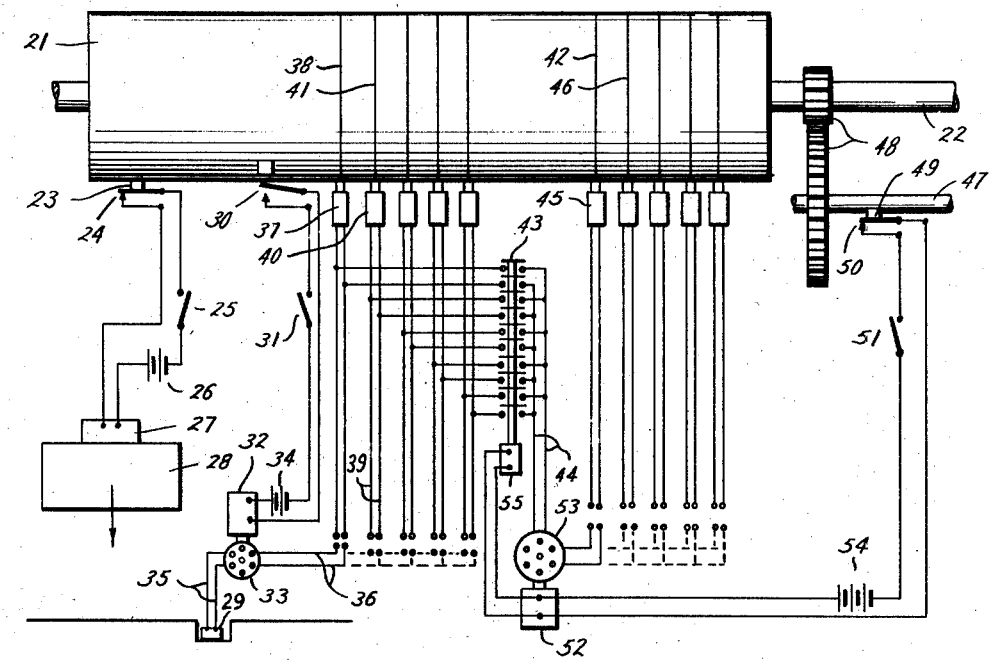

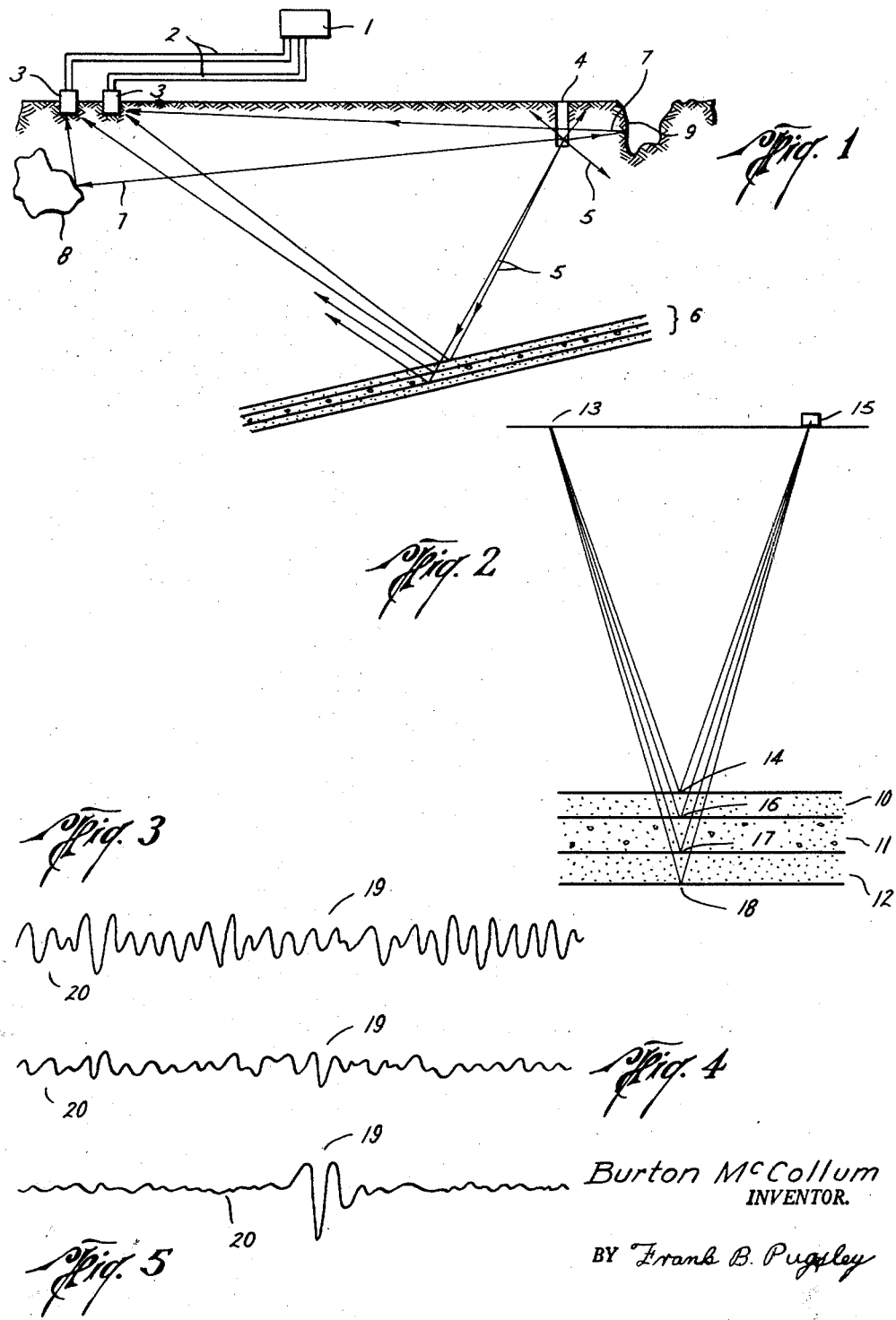

Burton McCollum
INVENTOR.

BY Frank B. Pugsley
ATTORNEY

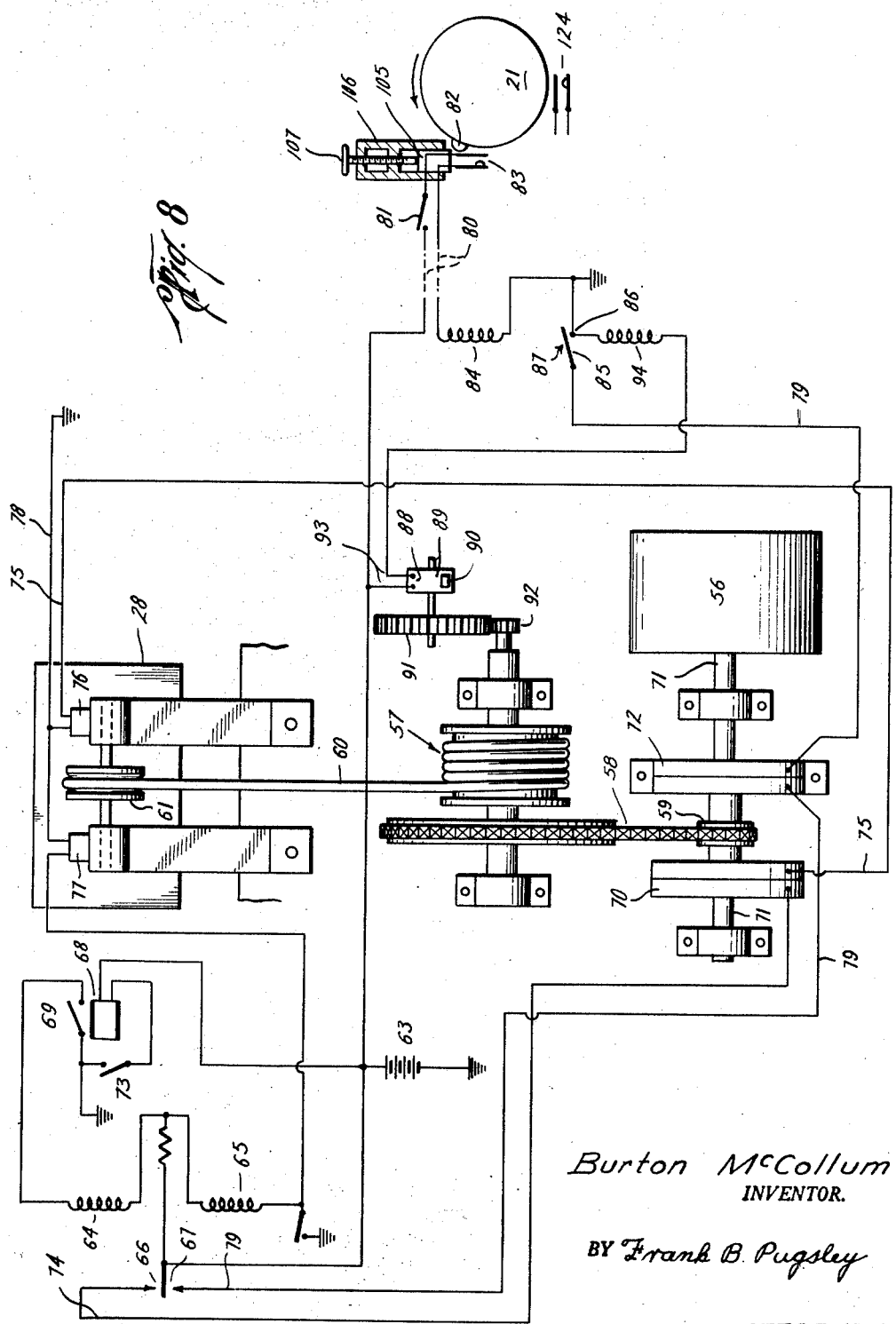

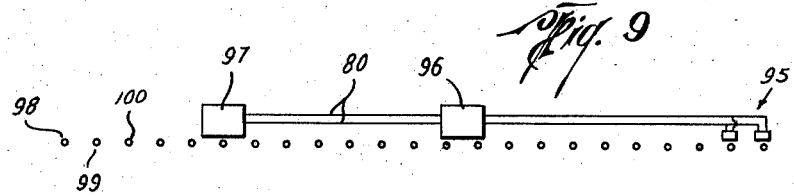
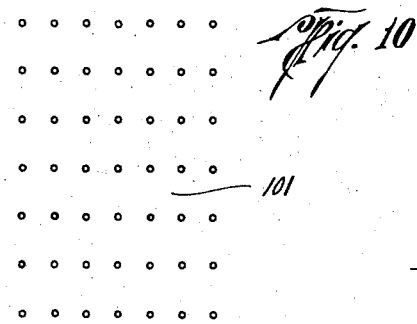
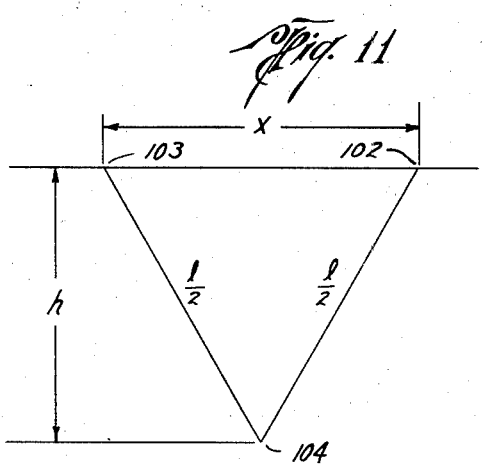
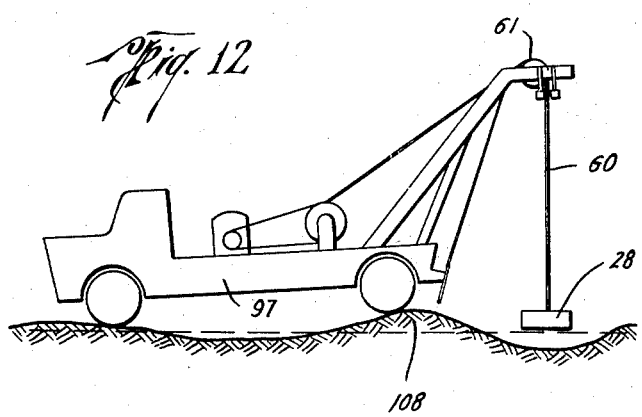
Burton McCollum
INVENTOR.
BY Frank B. Pugsley
ATTORNEY Sept. 9, 1958            B. McCOLLUM            2,851,121

METHOD AND APPARATUS FOR SEISMIC EXPLORATION

Filed March 1, 1954            7 Sheets-Sheet 5

Burton McCollum
INVENTOR.

BY Frank B. Pugsley

ATTORNEY

Sept. 9, 1958  B. McCOLLUM  2,851,121
METHOD AND APPARATUS FOR SEISMIC EXPLORATION
Filed March 1, 1954  7 Sheets-Sheet 6

Burton McCollum
INVENTOR.

BY Frank B. Pugsley

ATTORNEY

Sept. 9, 1958      B. McCOLLUM      2,851,121
METHOD AND APPARATUS FOR SEISMIC EXPLORATION
Filed March 1, 1954      7 Sheets-Sheet 7
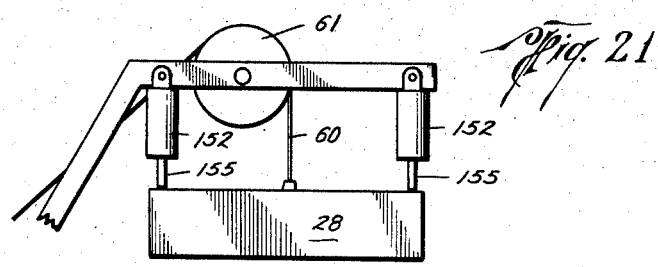
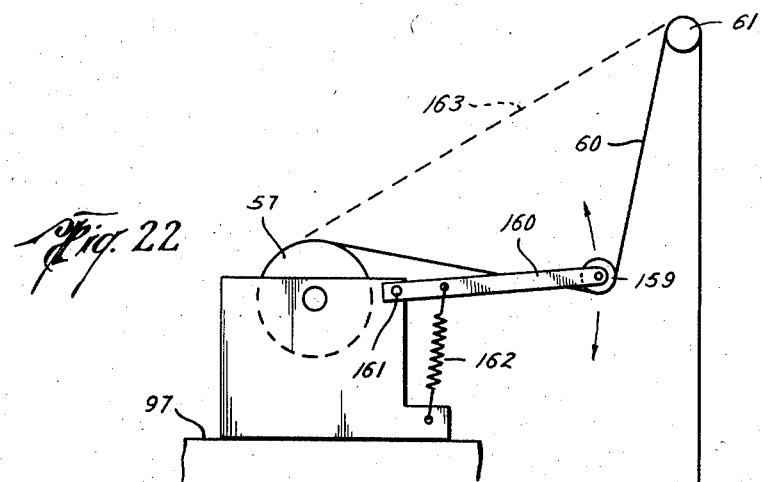
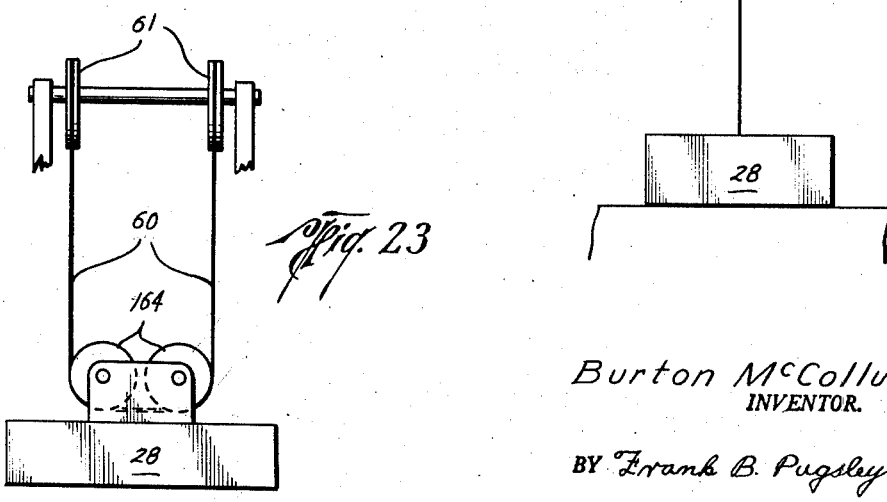
Burton McCollum
INVENTOR.
BY Frank B. Pugsley
ATTORNEY

2,851,121

METHOD AND APPARATUS FOR SEISMIC EXPLORATION

Burton McCollum, Houston, Tex.

Application March 1, 1954, Serial No. 413,297

28 Claims. (Cl. 181—.5)

This invention relates to a method and apparatus for exploring subsurface geology by means of a seismograph, and particularly to certain new and improved procedures and apparatus for generating and recording seismic waves. It is a continuation in part of my application S. N. 195,377, filed November 13, 1950, now Patent No. 2,767,389.

While present methods and apparatus for seismic exploration provide valuable information concerning many formations, they have definite limitations. In essence, the present wave generation techniques involve the use of a charge of explosive which is placed in a hole and then fired. The resulting detonation sets up an elastic wave traveling in all directions. Upon encountering boundaries of unlike materials, a part of the wave energy is reflected, the magnitude, character and direction of propagation of the reflected wave being in accordance with well known laws. One or more detectors, connected to a recording device and placed in a predetermined position with respect to the shot hole, receive these reflected waves. Their time of arrival, with respect to the firing of the shot, is determined from the records obtained with the recorder. If the reflected events are sufficiently clear and definite on the record, the depth and dip of the reflecting boundaries can be readily determined by well known means. In such determinations the components of the waves which travel in a relatively vertical direction are the principal portions of the wave that are useful to the geophysicist in mapping subsurface formations.

Some of the difficulties with such methods are caused by the marked anomalies frequently occurring in the zone near the surface, in consequence of which the instrument records not only the relatively vertically traveling reflected waves, but also a great profusion of substantially horizontally traveling waves. These approximately horizontally traveling waves are reflected or refracted from numerous boundaries which may be caused by a variety of conditions, such as, marked changes in velocity in the sediments near the surface, interbedding of sands, clays, rocks, etc., erosional surfaces, faults and intrusions, all well known to the geologist. The horizontally traveling waves reflected from these boundaries are often of such magnitude as to largely or completely obscure the events on the record in which the geophysicist is most interested. Furthermore, certain earth disturbances caused by wind, traffic or natural earth movements are picked up by the detectors and add to the difficulty of identifying the useful reflected events on the record. Even if the useful events are not entirely obscured, the several groups of interfering waves produce phase displacements and distortions that often give rise to serious errors of interpretation. Consequently, the explosive charge has generally been made large in an effort to give the reflected wave trains an energy level substantially greater than that of the earth disturbances. This requires a deep and therefore expensive shot hole to prevent blowouts. Moreover, the large explosive charge gives rise to serious disruptive effects which absorb and dissipate a large part of the energy of the shot, the initial pressure developed varying from ten to over a hundred times the elastic limit of the surrounding formation. Further, firing any charge of explosive below the surface of the earth inherently generates a large number of waves in all directions including the interfering horizontally traveling waves. Finally the expense of the shot holes, the cost and danger of the explosives, and the increasing reluctance of landowners to permit such techniques to be employed on their land, present economic and social difficulties of growing seriousness.

In an effort to overcome the disadvantages of wave generation by explosive charge, I experimented with falling weights very early in the history of seismic exploration. My experience, however showed that to generate a seismic wave of sufficiently high level to penetrate the desired depths and yield reflected events of sufficient intensity to override earth poises required a weight of such great size that the transportation and handling problems involved were prohibitive. Moreover, the seismic waves generated by such heavy weights radiate most of their energy on very long wave lengths, with the consequent disadvantage outlined hereinafter. Because of these factors explosive charges continued to be the universal basis of seismic wave generation.

Accordingly, it is an object of my invention to provide a new method and means for generating seismic waves in combination with a particular method of recording such waves, whereby usable results are achieved with waves of insufficient intensity to be normally of value with the usual methods of recording.

Another object of my invention is to provide a method and means for generating useable seismic waves without exceeding the elastic limit of the formation.

Another object of my invention is to provide a method and means for generating seismic waves whereby the generation of horizontally traveling waves is minimized.

A further object of my invention is to provide a method and means for generating seismic waves whereby the use of explosives and the need for shotholes is eliminated.

Still another object of my invention is to provide an improved method and means for recording repetitive seismic pulses whereby the useful reflected waves are distinguishable over horizontally traveling waves, natural earth movements, and other interfering events.

In carrying out my invention I employ a succession of very small impacts, the reflected waves from which are separately recorded and later integrated into a single composite record. In the presently preferred form my wave generation technique involves the use of a weight falling to the ground under the influence of gravity, provision being made for correcting or compensating for variations in ground conditions, and controls being provided for hoisting, dropping and timing the falling weight. Instead of using a very large weight sufficient to give a wave of the required intensity, I prefer to use a relatively small weight and drop it a great many times, each time making a record, preferably on a magnetic sound recording device. After a sufficient number of such records have been made, they are all combined by means of an instrument that I call an integrating recorder, into a composite record in which the vertically traveling events are integrated into a record of high energy level, while, if proper techniques, as described below are used, all horizontally traveling waves and earth noises are greatly reduced in intensity, thus yielding records of very superior quality. Broadly, an integrating recorder is any recording devise which is capable of making and integrating a plurality of records in which certain desirable events are synchronously recurrent; that is, they recur on each successive record at the same time with respect to the origin of such events. Thus if a series of such events be made and properly integrated, the energy level of the synchronously recurring events will rise steadily as the number of individual records is increased. However, certain undesirable events, such as those coming from earth noises and others, are largely fortuitous as to time of arrival and will therefore not be accumulative in the integrated record. The result is a progressive improvement in the quality of the record as the number of primary records is increased. The basic idea of combining two or more records to form a composite is not new, it having heretofore been used in a restricted sense as a wave analyzer, but such use is definitely different as to both objective and procedure from that used by me in the present invention. In the wave analyzer, as heretofore used in seismic explorations, a plurality of records are made simultaneously from a single seismic wave arriving at different times at a plurality of detecting stations, each record being taken from a different detector group, and then through an adjustable mechanism the corresponding events are brought into time coincidence and a composite made. The operation is slow and cumbersome, requires as many recording channels as there are primary records used in the composite record, and further, it requires as many detector stations as there are primary records. In my use of the integrating recorder, I use a separately generated seismic wave for each primary record, moving the source to a new location after each record, thereby cancelling out horizontally traveling waves. I can use a much simpler and more compact recorder since my technique enables me to integrate a very large number of primary records with only a few recording channels, and I need only a single detector station, even though a large number of primary records are to be integrated. By using a large number of separately generated seismic waves, I am able to use a relatively weak impact, thereby eliminating many of the disadvantages of the present methods, as set out above, and in particular, I can use a small and easily manageable falling weight to generate the seismic waves. In the practical use of these principles, I have developed many new techniques for initiating and controlling the various operations, both in connection with the integrating recorder and in the dropping of the weight. These will be described in detail hereinafter.

Figure 7:
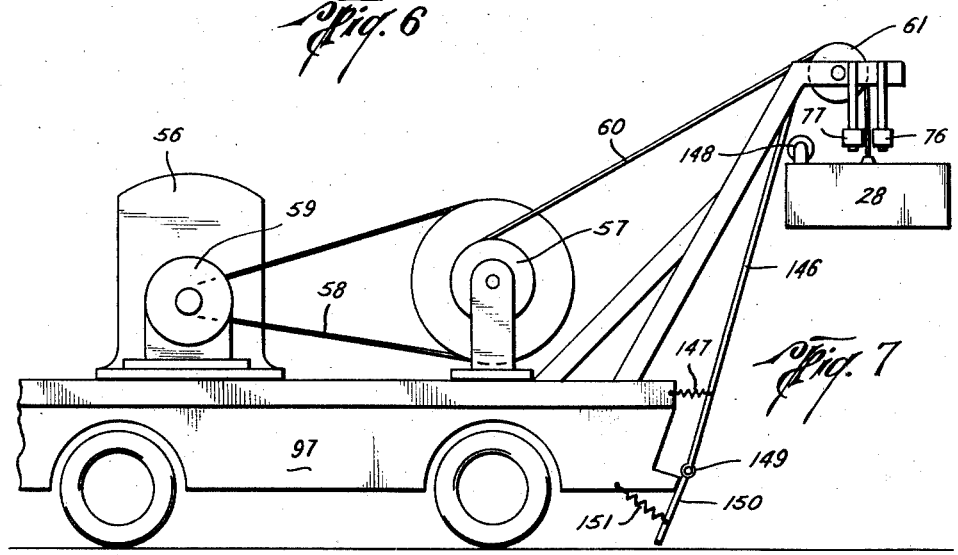
Figure 13:
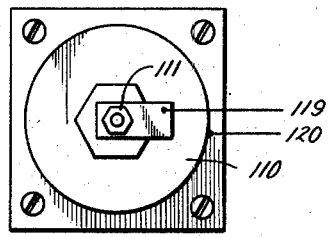
Figure 15:
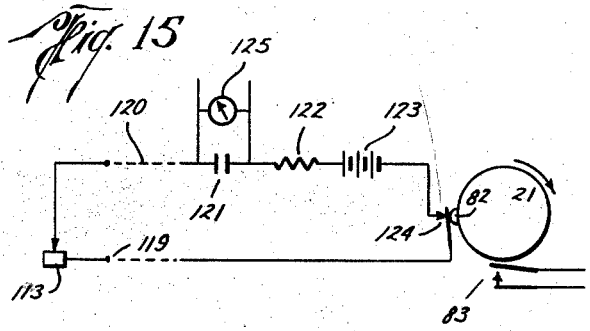
Figure 16:
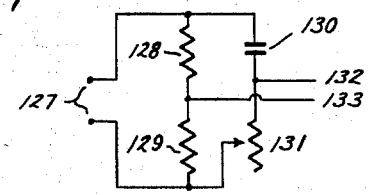
Figure 14:
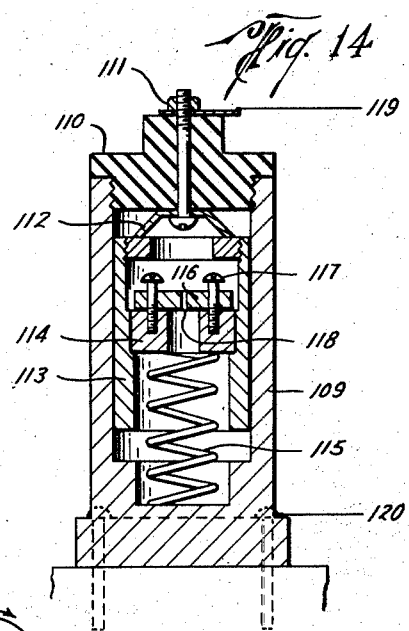
Figure 17:
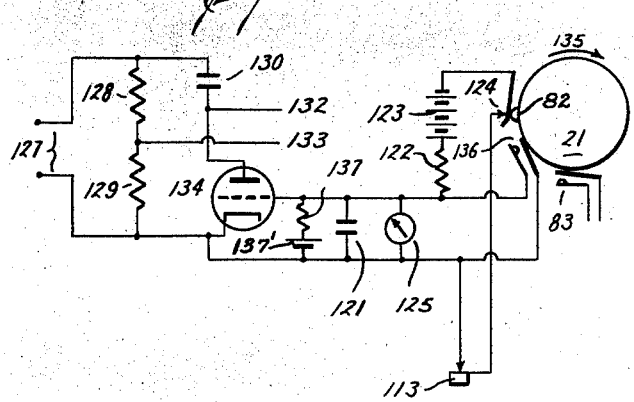
Figure 18:
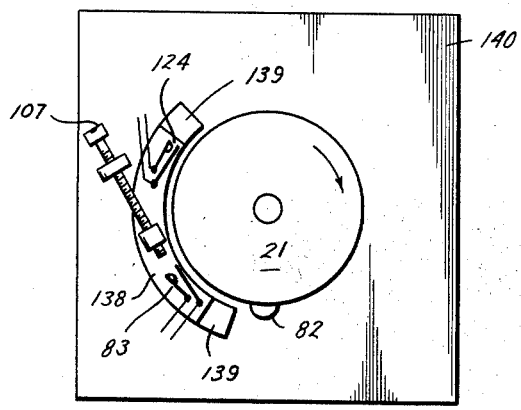
Figure 19:
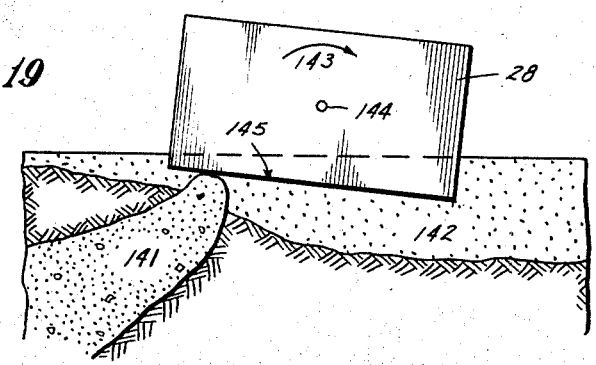
Figure 20:
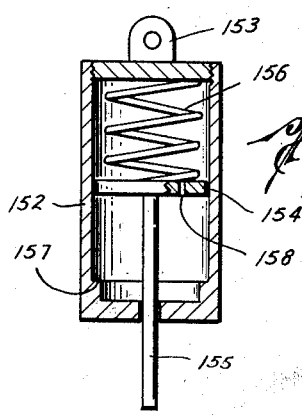

For a more complete understanding of my invention reference should now be had to the following detailed description taken in conjunction with the accompanying drawings, in which Figs. 1 and 2 are sectional views of typical earth formations, illustrating the difficulties encountered and the limitations of conventional methods and apparatus for seismic exploration; Figs. 3, 4 and 5 diagrammatically illustrate typical records made by employing my seismic generating technique in combination with my integrating recorder; Fig. 6 is a schematic elevational view of one form of my integrating recorder, including the electrical circuits used; Fig. 7 is a side elevation of one form of my improved apparatus for generating seismic waves; Fig. 8 is a schematic plan view of a portion of the apparatus of Figs. 6 and 7, including the basic electrical circuits; Fig. 9 is a schematic illustration of a practical field plan for utilizing my invention; Fig. 10 is a schematic illustration of a modified field plan; Fig. 11 is a diagram showing certain quantitative relationships which must be considered in using my invention; Fig. 12 is a side view similar to Fig. 7 of my wave generating apparatus, but illustrating a common source of error for which compensation must be made; Fig. 13 is a plan view of an impact detecting apparatus for use with my wave generation and recording means; Fig. 14 is a sectional elevation of the apparatus of Fig. 13; Fig. 15 is a circuit diagram for my means of timing the drop of the weight; Fig. 16 is a circuit diagram for a typical phase shifting circuit which may be employed in connection with recording reflected waves; Fig. 17 is a circuit diagram of the phase shifting circuit of Fig. 16 as adapted to the special purposes of my invention; Fig. 18 is a detailed view of another evaluation and control device which may advantageously be used with my wave generating apparatus; Fig. 19 is a sectional view of an earth formation frequently encountered which must be taken into account in designing the weight used in my wave generation apparatus; Fig. 20 is a sectional elevation of a damping device which may advantageously be used with my invention; Fig. 21 is a side elevation of my weight in conjunction with damping devices such as shown in Fig. 20; Fig. 22 is a fragmentary side elevation of my weight dropping apparatus, illustrating a slack take-up device for the supporting cable; and Fig. 23 is an elevational view of a modified weight supporting arrangement.

Referring now to Fig. 1, some of the inherent difficulties of seismic exploration techniques commonly used are graphically illustrated. Such techniques involve the use of a recording device 1 connected by wires 2 to one or more detectors 3. A charge of explosive is fired in a hole 4 usually at a depth of from fifty to a hundred feet or more. This sets up an elastic wave traveling in all directions, as indicated by the arrows 5. When such waves encounter boundaries 6 of two unlike materials, reflections occur, as indicated by that portion of the waves 5 which travel in approximately a vertical direction. These reflections are received at the detectors 3 and their time of arrival is determined with respect to the firing of the shot. If the useful reflected wave components are sufficiently clear and definite on the record, the depth and dip of the reflecting boundaries 6 can be determined by well known means. Unfortunately the previous mentioned anomalies frequently occurring near the surface can cause the reflection of a great profusion of substantially horizontally traveling waves 7 which are reflected or refracted from numerous boundaries such as 8 and 9. The interference caused by these horizontally traveling waves and of earth noises, as discussed hereinbefore, are well known.

The importance of wave length to the quality of records is clarified with reference to Fig. 2. Here there are shown three adjoining strata 10, 11 and 12, all differing from one another in physical characteristics. A seismic wave originating at 13 will have a certain percentage of the wave energy reflected at the boundary 14 to a detector 15. Also reflected events are produced at boundaries 16, 17 and 18, all of which actuate the detector 15 in sequence. If the wave length of the seismic pulse is sufficiently short, the record of events arriving at detector 15 will show four separate and distinct events, so that any variations in thickness, dip or depth of any of the horizons will be made apparent by the record. If, however, the wave length is too long, reflected events from boundaries 16, 17 and 18, will arrive at detector 15 before the record of the reflected event from boundary 14 is completed. Thus, several or even all four of the events may merge into a single composite event, causing confusion of the events and resulting in lack of recognizable character. This makes correlation between successive stations difficult if not impossible.

Figs. 3, 4 and 5 demonstrate the power of the integrating recorder to increase the ratio of signal strength (useful events) to noise level. Fig. 3 shows a single record containing a weak recurrent event which occurs at a point 19 on the record, but which is so weak that it is completely obscured by the high noise level. Fig. 4 shows a composite of ten repetitions of the record of Fig. 3, taken under conditions whereby the event at 19 recurs at the same time relative to the beginning of the record at 20. In the composite of ten records the event at 19 has become definitely recognizable, but still very imperfect in the presence of the still high noise level. Fig. 5 shows a composite of fifty of the records of Fig. 3. Here it will be seen that the recurrent event 19 is greatly amplified. The stray events, which are fortuitous in wave form, time and intensity, are substantially self canceling on the integrated record, so that the noise level is substantially reduced, making the recurrent event 19 stand out clearly.

One embodiment of my integrating recorder is shown in principle in Fig. 6. This is shown as a magnetic type recorder, which I prefer because of the greater facility with which erasures and repetitions can be made, as compared with other types. In Fig. 6, a drum 21 is coated with a magnetic material suitable for recording purposes. I prefer an electrolytically deposited alloy because of the superior properties thus obtainable for recording purposes. Methods of producing these coatings are well known. The drum 21 is adapted to rotate about its axis 22 at a very uniform speed, the speed being held constant by means of a turning fork or other very accurate timing device. This is accomplished by well known means. At some point on the drum, as at 23, is placed an electrical device which, for illustrative purposes may be assumed to be a cam-like protrusion, which, at a certain point in the revolution of the drum, actuates an electric contact device 24. This, if the manual switch 25 be closed, completes the circuit from the battery 26 through an electric trigger device 27 adapted to initiate a seismic wave. For purposes of this description, we shall assume that initiation of the wave is accomplished by releasing a mass 28 which, when it strikes the ground, generates the desired seismic wave. Reflected wave components are picked up by a detector 29. Also, at some other point on the periphery of the drum may be placed another cam, so placed that it operates a contact device 30 some time before the aforementioned mass strikes the ground. When the contact 30 is closed, the manual switch 31 being assumed closed, a control coil 32 of a step switch 33 is energized from a battery 34, and wires 35, leading from the detector 29 are coupled to wires 36 leading to a recording head 37, and a record of the seismic wave is made on a sound track 38. While the record is being made, or at any time thereafter, the weight 28 is again raised to the same height from which it was previously dropped and is there held suspended by the trigger operated device 27 until again released in like manner by a subsequent revolution of the drum 21. After the first record is made, the contact device 30 again energizes the control coil 32 of the step switch 33, and the detector wires 35 are switched to the wires 39, so that the next seismic wave is recorded through the recording head 40 on the sound track 41. This operation can be repeated as many times as desired. In actual practice I have found it very important to arrange the recording heads 37, 40, etc., in groups, to function as described below. For purposes of illustration we will assume that there are five recording heads in each group, although in practice, I prefer a larger number. When all five of the recording channels of group I have been filled, there is made a composite of all five records, which composite is recorded on the first channel 42, of group II. This may be accomplished manually by the following means: A gang switch 43, wired as shown, is adapted to be thrown to its closed position whereupon it will throw all five of the recording heads of group I together in any desired manner, as in parallel, series, or series-parallel, and couple all five of the recording channels together on the wires 44, which lead to the recording head 45, of group II, whereupon the composite of all the channels of group I is recorded on channel 42 of group II. The recording channels of group I can then be erased by well known means, and all is in readiness for a repetition of the series. In a similar manner, a second series of records is made into a composite and recorded on channel 46 of group II, and so on until all of the channels of group II have been filled. There will now be stored in group II a total of twenty-five records which can be made into a single composite and recorded in like manner on the first channel of a third group (not shown), or the composite can be photographed in the usual manner for geophysical analysis. It will be seen that by the method outlined above, I have been able to record and integrate a total of twenty-five records on only ten recording channels. If the procedure is continued until the five channels of the third group are filled, I shall then have recorded and integrated 125 records by using fifteen recording channels. This group system of recording and integrating offers great advantages in the direction of making it possible to integrate a very large number of individual records on relatively few channels. An analysis will show that if "$x$" groups of recording channels are used, each group comprising "$y$" channels, the total number of channels will be $x$ times $y$, or $xy$, while the number of records that can be integrated, will be $y$ raised to the power $x$ or $y^x$.

The above described procedure for manually integrating the records is entirely practical and I have used it successfully. However, there are great advantages in using automatic controls. These may take a variety of forms, of which the following is a simple example: A countershaft 47 is geared to the shaft 22 through a gear combination 48, the speed of the countershaft being reduced in relation to the shaft 22, by a ratio numerically equal to the number of recording channels in each group. On the countershaft 47 is placed a cam 49 or other switching device, which, at an appropriate point in its revolution, actuates an electrical contact 50, which, if a manual switch 51 is closed, energizes a control coil 52 of a step switch 53 from a battery 54, thereby connecting the wires 44 to the recording head 45. At the same time a solenoid 55, for operating the gang switch 43, is energized so as to couple all the channels of group I together on the wires 44. A similar arrangement can obviously be applied to any number of groups of recording channels by adding an additional countershaft for each additional group of recording channels.

I will now describe the basic elements involving the use of a falling weight as a source of seismic waves. A number of important practical problems arise in this connection, the solutions of which are important in making the falling weight a practical source of seismic waves. One group of such problems involves the hoisting and control of the weight with special reference to accurate timing of the operations. While certain of the essential operations can be controlled manually, I have been able to secure greater accuracy of timing and greater speed of operations by the use of properly designed automatic controls. Among other things, these controls must provide for the following operations in the proper sequence: (1) hoisting of the weight to a precise height; (2) holding the weight at the proper height until the exact time for its release; and (3) release of the weight at a precise time with respect to the position of the recording drum, in order to insure proper integration of successive records. Another problem grows out of the fact that ground conditions will often vary greatly from point to point. There will be variations in slope, local prominences or depressions, and varying degrees of compressibility of the soft surface soils. In consequence of these, even though the weight may be dropped always at the proper instant and at the same height, the effective time of the impact with the ground will vary, and provision must be made to evaluate and make correction for these variables. Other provision also must be made for other factors of vital importance, as will later be disclosed.

My improved method and apparatus for the generation of seismic waves by means of a falling weight will be made clear by reference to Figs. 7 and 8. Referring to Fig. 7, which shows in elevation an elementary form of the main features of the hoisting system, a motor 56 drives a hoisting drum 57 through a suitable reduction gear, here exemplified by a chain drive 58 and a sprocket wheel 59, which latter, at the proper time in the operating cycle, may be coupled to, or uncoupled from, the motor 56. A hoisting cable 60, adapted to be reeled in by the drum 57, passes over an elevated sheave 61, and is attached to the weight 28, which is to be dropped to generate the seismic wave. When the weight has been raised to its full height, it may be dropped in a variety of ways. For example, the hoisting cable may be detached from the weight by a remotely controlled latching device, or the weight may be held by an electromagnet so that de-energizing the magnet will permit the weight to fall. Both of these means have been found to be operative in practical trials. Another way is to hold the weight in the elevated position by means of a remotely controlled brake on the draw works, and drop the weight by releasing the brake, which means I have chosen to illustrate the essential features of my invention. This very simple form of hoisting device, which I have used successfully, is shown in Figs. 7 and 8 and will be used for describing the typical operating cycle involved in the practice of my invention, and the numerous special techniques which I have found it necessary to develop in order to make a practical embodiment of the falling weight technique for seismic explorations.

Referring now to Fig. 8, a battery 63 supplies power for the control system. The motor 56 which drives the hoist may be of any type, although I prefer an internal combustion type. For hoisting the weight, two relays are used. One is a latching relay operated by solenoids 64 and 65, which alternately actuate contacts 66 and 67; and the other is a spring loaded relay 68, designed to operate a switch blade 69. An electrically operated clutch 70, when energized, couples the motor 56 to the sprocket 59 through a shaft 71. An electrically operated brake 72, when energized, locks the sprocket 59 to the framework and stops rotation of the drum 57 through the chain 58. When it is desired to start the operating cycle a switch 73 is closed momentarily, whereupon the coil 68 is energized, causing the switch 69 to close momentarily. It will be seen from the wiring diagram that the closing of this switch puts current from the battery 63 through the solenoid 64, which closes the latching relay contact 66. This energizes the electrical clutch 70 through wires 74 and 75, and a normally closed contact switch 76, to ground; the motor 56 then hoists the weight 28 through the chain 58 and the cable 60. When the weight reaches a predetermined height, it exerts pressure on, and thereby closes, a normally open contact switch 77. This energizes the solenoid 65, from the battery 63, through the wires 78 to ground. This energizing of solenoid 65 operates the latching relay to open contact 66 to open the clutch circuit and stop the weight, and it also closes contact 67, which energizes the brake 72 through wires 79 to ground, the relay contact at 86 being assumed closed. This locks the hoist and holds the weight in its predetermined elevated position. The weight is now ready to be dropped for the making of a seismograph record.

Since this device is used in conjunction with the integrating recorder, it is necessary, in order that successive records will integrate properly, that the weight always be dropped at precisely the same position of the rotating recording drum 21, shown in both Figs. 6 and 8. This recording drum is preferably mounted on a separate vehicle some distance away from the weight truck, and connected thereto by weight control wires 80. When the operator is ready to make a record he closes the manual switch 81, and it will be seen that on the next succeeding revolution of the recording drum 21, the cam 82 will close the weight control switch 83. It will readily be seen that this energizes, momentarily, the solenoid 84, and throws the latching relay contact arm 85 from the contact point 86 to the point 87. This opens the line 79, thereby releasing the brake 72, and the weight 28 falls to the ground to generate the seismic wave. It will readily be understood that as the weight falls the drum 57 and its connected parts develop a rather high speed, so that when the weight strikes the ground the moving drum tends to overshoot thereby fouling the cable. To prevent this I use contact switching means 88 associated with a drum 89, the drum having mounted thereon a conducting segment 90. The drum shaft is geared to drum 57 through the gears 91 and 92, the ratio of these gears being such that the unwinding of the cable as the weight falls to ground will cause the drum 89, to rotate considerably less than one revolution. Also, as part of the switching means 88 I provide contact fingers 93 so adjusted that at about the time when the weight 28 strikes the ground, these contact fingers are bridged by the conducting segment 90. It will be seen that this energizes the solenoid 94, which switches the latching relay contact arm 85, from point 87 to point 86, and since the contact 67 is still closed, the brake 72 will be energized, thus bringing the drum 57 to a quick stop, and preventing excessive unreeling and fouling of the cable 60. I prefer that the switch 81 be a spring loaded switch which will open as soon as released. An examination of the circuits will show that after the above described sequences have been completed, the system is in proper condition for a repetition of the operating cycle.

The stopping of the weight when it has reached the proper height should not be entirely dependent on the operation of the relay coil 65, and its opening of the contact 66. Otherwise, if the contact 66 failed to open, the clutch 70 would continue to function and the weight would continue to rise until the draw works were jammed, thus resulting in injury to the hoisting system or breaking the cable 60. Consequently, a safety switch 76 is provided. This is a contact switch which is normally closed, but which is opened by pressure of the weight if it rises a short distance above the point at which it closes contact 77 to normally stop the weight. Hence, if the weight is not stopped by closing the contact 77, it almost immediately opens contact 76. It will be readily seen from the drawing that this opens the clutch circuit whether or not the relay contact 66 has functioned normally. This renders overshooting of the weight, and consequent damage to equipment virtually impossible.

A typical field procedure in conducting seismic explorations, using the integrating recorder in conjunction with a falling weight as a source of seismic waves, is illustrated in Fig. 9. A wave detector system 95, which may consist of a single detector unit, or preferably may comprise a number of detector units spaced apart and coupled electrically as a single unit, and connected through conventional amplifiers, with or without filters, to an integrating recorder mounted on the vehicle 96. The weight dropping truck 97 is placed at any suitable point with respect to the detectors, and connected to the recorder through the wires 80, as previously described. The distance separating the weight truck and the detectors may vary widely, but will usually be less than half a mile. The weight is dropped as hereinabove described, beginning, for example, at drop station 98, and a record is made and stored on one of the magnetic recording tracks. The weight truck is then moved a short distance, usually between a few feet and several hundred feet, to station 99, and another record made and recorded on a second recording channel. This operation is repeated any desired number of times, preferably moving the weight truck to a new location for each succeeding record, after which a composite record is made in the manner hereinabove described. This record is then either protographed for geophysical analysis, or preferably it may be stored on a storage channel for future use.

The moving of the weight truck, or other source of seismic waves, after each drop is an important feature of my invention. If this movement is kept within proper bounds, the reflected waves from successive drops will all arrive at the detectors closely enough to the same time after the dropping of the weight so that they will integrate effectively on making the composite record, while the horizontally travelling waves from successive drops will be so far out of phase as to fail to integrate, and will often actually interfere and cancel each other. Therefore by integrating a large number of records taken in the manner above described I can in large measure eliminate from the final composite record the natural earth disturbances and horizontally travelling waves hereinabove mentioned and a very great improvement in the character of the records is obtained. The number of records that have to be integrated in order to produce a satisfactory composite record will vary greatly depending on the difficulties encountered in any locality. In some areas where subsurface conditions are favorable as few as five or ten integrations may suffice, while in other areas as many as one hundred or more integrations may be required.

The extent of the movement of the weight between consecutive drops, as well as the pattern of such movements is important. In general, if conditions are such that a small number of drops will suffice, I prefer to drop the weight at points lying approximately along a straight line which may bear in any direction, but preferably bearing more or less in the direction of the detector stations, as indicated by the consecutive drop points 98, 99, 100 etc. If, however, a much larger number of drops is required, I prefer to dispose the drop points over an area, as for example, over the area embraced by the rectangle 101, as shown in Fig. 10. This permits a large number of drops to be used without too much lateral dispersion, so as to permit effective integration of vertically travelling waves, while at the same time maintaining sufficient spacing between consecutive drops to give an effective suppression by the integration process of horizontally travelling waves and earth noises. This is subject however, to the limitations set out below. In general, the greater the separation of the individual drops the more effective will be the suppression of the troublesome horizontally travelling waves. However, if this separation be too great, the vertically travelling waves will not integrate efficiently.

The quantitative factors in this problem can be clarified by reference to Fig. 11. If a detector station be placed at 102, and the source of the seismic waves, be at 103, a geometrical analysis clearly reveals the limitations in question. If we designate the distance between the detector 102, and the seismic source 103 as "$x$," the depth of the reflecting horizon as "$h$," and if the total distance traveled by the reflected ray in travelling from the source at 103 to the detector 102, by way of the reflecting point 104, be called "$l$" we derive the following formulas:

$$l = \sqrt{x^2 + 4h^2} \quad (1)$$

If "$v$" be the average velocity of the wave, then the time of travel is:

$$t = \frac{l}{v} = \sqrt{\frac{x^2 + 4h^2}{v}} \quad (2)$$

In order to illustrate the use of this equation there is given below a table of values calculated with certain assumptions of numerical values which experience shows to be commonly encountered. As a specific example we assume that the depth "$h$" of the reflecting horizon is 7,000 feet; the velocity 10,000 feet per second; and that the distance "$x$" between detector station and drop station is varied in steps of 100 feet from 1,500 feet to 500 feet. Substituting these values in Equation 2 we get the data shown in Table 1, $t$ being the travel time in seconds along the path of the reflected wave.

Table 1

| x | t |
|---|---|
| 1,500 | 1.4081 |
| 1,400 | 1.4070 |
| 1,300 | 1.4060 |
| 1,200 | 1.4051 |
| 1,100 | 1.4043 |
| 1,000 | 1.4036 |
| 900 | 1.4029 |
| 800 | 1.4023 |
| 700 | 1.4017 |
| 600 | 1.4013 |
| 500 | 1.4009 |

The total change in travel time is the difference between the first and last figures in the second column, and this is .0072 second, or 7.2 milliseconds. If we make a composite of the records represented in Table 1 we are dealing with the superposition of vectors, and the principles of vector analysis apply. It will be readily seen, therefore, that if two vectors that differ in phase by considerably less than 90 degrees the summation will be very efficient, while if the phase angle is much greater than 90 degrees, the efficiency of integration will fall off rapidly. For practical purposes we may regard a 90 degree shift, or a quarter of a wave length, as the maximum that will integrate with satisfactory efficiency. If, now, we assume that the frequency of the records is around 35 cycles per second, a value commonly encountered, the wave length will be about 28 milliseconds, and a quarter wave length about 7 milliseconds. This subject is very important in relation to the use of the integrating recorder, and we will pursue the analysis further in order to develop a satisfactory basis for the use of the integrating recorder over practically all depth ranges encountered in practical exploration work. Assuming that we wish to utilize a spread of the drop stations over the range from 500 feet to 1500 feet as above assumed, we shall now calculate the variations in time of arrival of reflected events from reflecting horizons over the entire range of depths that are of commercial importance. These values are calculated from Equation 2 and are shown in Table 2 where "$h$" is the depth in feet of the several reflecting horizons and $\Delta t$, shown in column I, is the difference in time, in milliseconds, of arrival of reflected events from drops at the farthest and nearest drop station, viz. 1500 feet and 500 feet. As before "V" is taken as 10,000 ft./sec.

Table 2

| h | I<br>$\Delta t$ | II<br>$\Delta t - 7.1$ | III<br>$\Delta t - 10.4$ |
|---|---|---|---|
| 2,500 | 19.6 | 12.5 | 9.2 |
| 3,000— | 16.4 | 9.3 | 6.0 |
| 3,500— | 14.1 | 7.0 | 3.7 |
| 4,000— | 12.4 | 5.3 | 2.0 |
| 4,500— | 11.0 | 3.9 | 0.6 |
| 5,000— | 9.9 | 2.8 | −0.5 |
| 6,000— | 8.7 | 1.6 | −1.7 |
| 7,000— | 7.1 | 0.0 | −3.3 |
| 8,000— | 6.2 | −0.9 | −4.2 |
| 9,000— | 5.5 | −1.6 | −4.9 |
| 10,000— | 5.0 | −2.1 | −5.4 |
| 12,000— | 4.2 | −2.9 | −6.2 |
| 15,000— | 3.4 | −3.7 | −7.0 |

For reasons pointed out above if the time difference $\Delta t$ shown in Table 2 is in excess of about 7 milliseconds the integration process will be inefficient. This means that if I follow the procedure outlined above I shall be able to work effectively on reflection horizons at a depth of about 7,000 feet or deeper, since at these depths the time displacement of the reflected events is less than a quarter wave length. At shallower depths, the time displacements increase rapidly so that integration is unsatisfactory. However, horizons in the depth range between about 3,000 or 4,000 feet and 7,000 feet are of great importance, so that it is necessary to find means of broadening the scope of the operation. I have now devised a procedural technique which greatly broadens the zone of efficient integration and this will now be described.

Referring to Fig. 9, where 95 represents the detector station, there is assumed to be a series of drop stations 98, 99, 100 and following, spaced more or less uniformly along a line which may bear in any direction, but for the purposes of the present discussion it is assumed to be in line with the detector station 95. For the purpose of continuing the analysis above presented, it is assumed that the nearest of these drop stations is 500 feet from the detector station and the farthest one is 1,500 feet therefrom. I can begin dropping the weight at either end of the drop zone, so let us assume that it starts at the 1,500 feet station. When the weight is dropped at this point the time required for the reflected wave from the 7,000 foot horizon to reach the detector station can be read from Table 1. If now the weight is moved to the next drop point nearer to the detector station it will be evident that the travel time of the reflected wave will be slightly less than at the first station so that the two waves will not be exactly in phase, and will not, therefore, integrate with maximum efficiency. Suppose for illustration that the weight is first dropped at the 1,500 foot station and next at the 1,400 foot station, and that it is dropped from the same height and at the same position of the recording drum as postulated at 82 and 83 in Fig. 8. By referring to Table 1 we see that for the 7,000 foot horizon the second event arrives at the detectors about one millisecond earlier than the first, and as we proceed along the line this difference increases progressively, although at a diminishing rate. If, however, the contact switch 83, of Fig. 8, which drops the weight is mounted so that it can be shifted slightly in a tangential direction, and, if such a shift be made after the first drop but before the second, and if this shift be of such amount and direction as to cause the second drop to be one millisecond later than the first one then the reflected events from both drops will arrive at the detectors in the same phase relationship and the integration will be at maximum efficiency. This procedure may be continued throughout the entire length of the drop line from the 1,500 foot station to the 500 foot station, resetting the drop switch 83, at proper intervals so as to bring all reflected events from some one horizon into close phase co-incidence. It is not necessary to reset the drop contact 83 after every drop, but only at such intervals as may be necessary to prevent too great a phase displacement of the reflected waves. For example, if the drop stations are, say, 20 to 25 feet apart, I prefer to reset the drop contact 83 about once every five drops. This procedure keeps the phase displacement so small that integration of all reflected events from some one horizon, as here assumed, will be virtually perfect. It will be seen, however, that the resetting of the drop contact 83 in the manner here described will shift the phase not only of the reflected event from the 7,000 foot horizon, but from all other horizons. It is now in order to examine this problem to determine the effect on the integration of reflected events from other horizons.

If the drop contact 83 has been progressively reset so that all events arriving from the 7,000 foot horizon (or any other that may be chosen) arrive at the same time and phase, it will be seen from Table 2 that a total delay has been caused of 7.1 milliseconds between the terminal stations of the drop line, and this same shift applies to waves from all other horizons. Therefore, we deduct 7.1 milliseconds from each of the figures in column I and record them in column II; one will see immediately the effect on the integration efficiency of the events from all horizons. These figures are shown in coumn II of Table 2. Still assuming that a deviation in phase of a quarter wave length, or about 7 milliseconds is permissible without serious reduction in integration efficiency, it will at once be seen that the procedure of progressively resetting the drop switch 83, above described, has greatly broadened the range of effective operation. Whereas, in column I taken without resetting the drop switch, only those horizons below 7,000 feet fall within the effective operating zone, it is seen from column II that resetting the drop switch by amounts to give a total time shift of 7.1 milliseconds, all horizons below about 3,500 feet are brought within this zone. The data show that I may go further and by giving a still larger shift to the drop switch, so as to make the total time shift 10.4 milliseconds, the efficient operating range can be extended to all horizons below a depth of about 2,700 feet. This is shown by the data in column III of Table 2. Obviously the same principle as hereinabove set out applies, whatever the drop span or wave length may be. However, in the case of larger drop spans than here assumed, and with shorter wave lengths, other techniques become necessary, as disclosed in my copending application, Serial No. 423,347, filed April 15, 1954.

In order to accomplish the resetting of the drop switch 83 of Fig. 8, for the purpose hereinabove described, the contact 83 is mounted on a movable block 105. A fixed block 106 carries a screw 107, which serves to move the block 105, and therefore the contact 83, by any desired amount. Since the total movement required is very small, a tangential movement of the contact 83 is satisfactory. Of course, after each series of drops as above described, the drop contact 83 is reset to its original position before starting a new series of drops.

In the above described procedure for dropping the weight, the release mechanism that permits the weight to fall is triggered by the rotating recorder drum always at the same point in its revolution, as shown in Fig. 8, subject, of course, to the planned deviations above described. The purpose of this, obviously, is to cause the reflected events from recurrent drops to arrive at the recorder always in substantially the same phase so that efficient integration will occur. However, the release of the weight always at the same point in the rotation of the drum will not alone suffice to accomplish the desired result. Regardless of when the weight is released, or from what height it falls, the seismic wave is generated when the weight actually strikes firm ground. Under practical operating conditions several factors operate to cause variations in the time of actual generation of the seismic wave, even though the drop signal recurs always at exactly the proper time. Among other things, mass and friction in the release mechanism cause variations in the time between the drop signal and the actual release of the weight. Another cause of variation in the time of generating the seismic wave is unavoidable variations in height of fall. This is illustrated in Fig. 12. Due to irregularities of terrain a wheel of the weight vehicle may rest upon a local high point as at 108, thus raising the weight a little higher than normal. This difference may be aggravated by a local depression immediately under the weight 28. Thus the actual distance through which the weight falls may vary under field conditions as much as five or six inches, giving rise to variations in time of fall of fifteen or twenty milliseconds. Further, even on level surfaces, as well as elsewhere, the character of the surface layers of the ground will vary greatly from point to point. Where hard rocks lie very close to the surface, there is very little yielding other than the elastic displacements due to the falling weight so that the effective distance through which the weight falls will be substantially identical with the measured distance from the elevated weight to the surface of the ground. At other points there may be a soft inelastic layer of surface material varying in thickness up to several inches or more. A plowed field represents an extreme case of this condition. When the falling weight first starts to compress this material very little resistance will be encountered and hence no appreciable impact will be imparted to the ground at the instant of contact. However, as the soft material is compressed it is quickly compacted to an extent that causes it suddenly to assume a high degree of incompressibility. It is at this point that the effective impact of the weight occurs and the seismic wave generated. Since the weight has been traveling with moderate velocity, the compression of this inelastic layer results in the impact being developed later than would have been the case if no soft inelastic layer existed. Experience shows that the aforementioned causes of variation of impact time are so frequently encountered that it is the rule rather than the exception, that successive records will be so far out of phase that little effective integration of corresponding events occurs. It follows herefrom that in order to make the falling weight method a practical workable technique it is necessary to evaluate the above mentioned variables, and eliminate their effects from the records. I have devised an electronic monitoring and control system that detects and measures the sum of all of the time variations that occur from any or all causes between the sending of the weight release signal and the actual generation of the seismic wave. Further, this system automatically brings into operation compensating factors that result in bringing all corresponding events of the successive records into very close phase coincidence, so that effective integration occurs, regardless of the cause or extent of the time variations that may occur in the generation of the seismic wave. This system will now be described.

In its essence, my control system comprises the following basic elements: (1) An impact detecting device that determines the exact time of the generating of the seismic wave, and cooperates in evaluating and correcting for all variations from the norm; (2) A metering device that measures the deviation from the norm of the elapsed time between the weight release signal, and the actual generation of the seismic wave; and (3) A correction arrangement that shifts the phase of all incoming seismic events by an amount sufficient to correct for the deviation in the time of generating the seismic wave, after the operation of the weight release signal, thereby yielding virtually perfect integration of successive records. I have devised several ways of utilizing the principles above listed, in combination, to accomplish the purpose indicated, one of which is described in detail below.

I will first describe, in principle, the impact detecting device mentioned as element No. 1 above. As shown in Figs. 13 and 14, a case 109, preferably of metal, is mounted firmly on the falling weight 28. The top of the case is closed by a cap 110, which is preferably insulating and which carries a metal terminal 111, including a screw, nut and terminal bar, the screw being insulated from the case 109 by the part 110, except for contacting elements 112. An inertia weight 113 is placed inside of the case 109, this inertia weight being so dimensioned that it will slide freely in a direction parallel to the axis of the case. A ring 114 is fastened inside the inertia weight 113 preferably by a screw thread. This ring 114 serves as a supporting shoulder for a spring 115, here shown as a compression spring. Normally this spring holds the top of the inertia weight pressed firmly against the contact members 112, which are preferably springlike so as to yield slightly under pressure. It will be seen that normally there will be a continuous electrical circuit from the metal terminal 111, through the contacts 112, the inertia weight 113, and the spring 115, to the case 109. A check valve arrangement includes a plate 116, which normally rests on the ring 114, but is free to move up and down within the limits allowed by the screws 117. The plate 116 has a very small opening 118, and the space inside the case 109 is largely filled with fluid to serve as a damping agent. Suppose now the weight 28 be dropped as in the manner hereinabove described. When the weight 28 strikes the ground there will be a very sudden and powerful deceleration of the case 109, as well as a less sudden and less powerful deceleration of the inertia weight 113. Consequently, the inertia weight 113 continues to move downwardly with respect to the case 109 and exerts an abnormal pressure in the compression spring 115, depressing the spring and breaking the contact between the elements 112 and the inertia weight 113. This opens the electrical circuit between terminal wire 119 on terminal 111 and terminal wire 120 on the case 109. As the inertia weight 113 moves downwardly because of momentum it displaces fluid within the lower portion of the case 109, causing the fluid to exert pressure on the underside of the check valve plate 116, elevating it until its rise is checked by the heads of the screws 117. This permits fluid to flow rather freely from the lower part of the case 109 to the upper part. The inertia weight 113 must dissipate its remaining kinetic energy, and this energy will go into further spring compression and into work on the fluid. The spring 115 acts to decelerate the inertia weight until it comes to rest, and then the compressed spring 115 will restore the inertia weight to its initial position to reclose the electrical circuit between the wires 119 and 120. However, when this reverse movement of the inertia weight starts, the check valve plate 116 promptly makes contact with the surface of the ring 114, thereby checking the reverse flow of the damping fluid except through the small opening 118. This results in an appreciable delay in reclosing of the electrical circuit between wires 119 and 120. After this brief but important delay the device is again in its original position, and is ready for a repetition of the cycle. For reasons which will be made clear below, the delay in reclosing the electrical circuit should be in excess of about one tenth second but not more than three or four seconds. The rigidity of the spring 115, in relation to the mass of the inertia weight 113 is important. If the spring be too weak, mechanical vibrations involved in handling the weight will result in premature opening of the electrical contacts. Also, a small decelerating force caused by the weight falling on a small bush, shrub, or mat of other vegetation, or on the surface layers of soft earth, as in a plowed field, would cause the electrical contact to open prematurely. For reasons that will be made clear below, it is important that the electrical contact open only at the instant that the weight makes firm contact with comparatively solid earth, and thereby generates the seismic wave. To accomplish this objective the spring 115 should be given sufficient rigidity in relation to the mass of the inertia weight 113, so that the electrical contact between the wires 119 and 120 will not open until the decelerating force has reached a value of at least ten times gravity. The device above described is hereinafter called the weight switch.

I will next describe the second element of the monitoring equipment listed above. Referring to Fig. 15, the wires 119 and 120 leading from the weight switch 113 go to the recorder equipment where they cooperate with the other elements of the monitoring equipment. These wires are connected in series with a condenser 121, a resistance 122, a battery 123, and a contact switch 124, which is actuated by a cam 82 mounted on the synchronously driven recorder drum 21 at a precise, predetermined point in the revolution of the drum. A voltmeter 125, preferably of the electron tube type, is connected across the condenser 121 to indicate the voltage thereon. The functioning of this equipment is as follows: When the rotating recorder drum 21 reaches the point in its revolution when it actuates the contact switch 124, thereby closing the contact, a charging current flows into condenser 121, from battery 123, through the resistance 122. In a practical embodiment of this device, I prefer to so place the cam 82 on the recorder drum that the contact 124, will be closed about twenty or thirty milliseconds before the seismic wave is generated by the weight 28 striking the ground, in what may be called a normal fall, that is when none of the numerous causes of deviation in falling time, as mentioned above, occur. Experience shows that twenty-five milliseconds is a satisfactory period. Consider now that the weight 28 has been dropped upon the cam 82 actuating the switch 83, as explained in reference to Fig. 8. A short time later, and just before the weight strikes the ground in a normal fall the cam 82 closes the contact 124 and, since the weight switch contact at 113 is normally closed, it will be seen that there is a complete circuit including the battery 123, the resistance 122, and the condenser 121. Therefore, a charge will start to build up in the condenser, the rate of build up being determined by the voltage of the battery 123 and the value of the resistance 122. If these be kept practically constant, and if the resistance 122 be sufficiently large that the final voltage across the condenser is small compared to the voltage of the battery, then the rate of accumulation of charge in the condenser 121, and therefore the rate of rise of the voltage across the condenser, will for all practical purposes, be constant. Therefore the reading of the voltmeter 125 will, at any instant, afford a measure of the time that has elapsed since closing the contact 124, by the cam 82. In a practical embodiment I design the cam 82, or its equivalent, so as to keep the contact 124 closed for a certain brief period, preferably about fifty milliseconds, and the voltmeter is graduated to read directly in milliseconds of elapsed time, preferably fifty milliseconds full scale. It thus becomes a timing meter and it will hereinafter be so called, the contact 124 being called the timing contact. Now if I adjust the weight dropping switch 83 so that the cam 82 operates it and drops the weight at such a time that the weight will strike the ground, in the case of a normal drop, at a time about the middle of the fifty millisecond period above mentioned, the weight switch will open the contact 113 about twenty-five milliseconds after the condenser started charging. Since opening the contact 113 stops the charging process, the timing meter 125 will read twenty-five milliseconds and stand at that point until the condenser is discharged as described later. This cycle will be repeated as long as conditions are such as to give a normal drop, that is, when none of the variable factors above mentioned are operating to cause variations in the time of impact of the weight with the earth. If however, for any reason the weight is either delayed or advanced in striking the earth by, for example, ten milliseconds, the timing meter will read ten milliseconds higher or lower, as the case may be. Therefore, by simply watching the timing meter, the operator can tell how much, and in what direction the time of impact of the weight with the earth has deviated from the normal. If these time deviations are in any case too large to permit efficient integration of successive records the operator can discard and erase such records and drop the weight again.

However, in practice, it is found that terrain and other conditions will vary so much from point to point that a large percentage of the records will have to be discarded and this greatly retards the progress of the work and increases its cost. In order to avoid this I have devised a method of using this timing device in combination with a phase shifting device so that whenever there is a deviation of the impact time from the normal the voltage that is built up on the condenser 121 will not only measure the amount and sign of the deviation, but will automatically bring into play a phase shift of all of the events on the record so as to cause them to record at the same time they would have been recorded if there had been no deviation in impact time from the normal. This brings us to the third of the control factors mentioned above; viz., an automatic phase control system to compensate for the time deviations above referred to. This element of my invention will now be described.

Phase shifting is a frequently used technique in many electrical systems and many different types have been used. In fact, any electrical circuit containing inductance or capacity, either with or without a resistance can be used to produce phase shifts in electrical phenomena. One well known type that I have modified and adapted to my purposes is illustrated in Fig. 16. The input to the network is at the terminals 127. Across these terminals there are two fixed resistances, 128 and 129, which are connected in series. In parallel with this circuit is another embracing the condenser 130 and the variable resistor 131. The output of the system is through the terminals 132 and 133. If an alternating voltage be impressed at the terminals 127, the voltage taken off at the terminals 132 and 133 will be displaced in phase with respect to the input signal, and the extent of this displacement will vary with the resistance 131. In general the higher the resistance 131 be made, the greater will be the phase lag of the output with respect to the input. In modifying this type of phase shifter to meet my requirements I use the arrangements shown in Fig. 17. Here the resistance 131 is replaced by the plate circuit of an electron tube. This is illustrated here by the triode 134. As is well known the resistance of the plate circuit is a function of the voltage impressed on the grid, so that this affords a very convenient means of varying the resistance to shift the phase. In Fig. 17 this type of phase shifter is further shown combined with the control system of Fig. 15. In operation the rotating recording drum carrying the cam 82, or its equivalent, is rotating in the direction indicated by the arrow 135. As this cam passes the contact 83 this contact is closed and this drops the weight as explained in conjunction with Fig. 8, as the drum further rotates the cam 82, closes a contact 136, thus momentarily completely discharging the condenser 121. As the cam 82 moves farther, contact 136 is opened and contact 124 closed, as described above, for a period of fifty milliseconds. This starts the charging of the condenser 121, and this charging process continues, gradually raising the voltage on the condenser 121, and therefore on the grid of the tube 134. This charging process continues until the weight strikes the ground, opening the weight switch 113, whereupon the charging of the condenser is stopped and if its capacity is sufficiently large in relation to any leakage circuit such as the grid leak 137, the voltage on the condenser and therefore on the grid of the tube 134, will remain virtually constant during the succeeding few seconds during which a record is being taken. The voltage impressed on the grid of the tube 134, by the combination of the positive biasing battery 137′ and the charged condenser 121, will, as explained above, be definitely determined by the time of the opening of the weight switch 113, and therefore by the time the weight 28, strikes the ground. If, for illustration, the weight strikes the ground earlier than normal the reflected events will tend to come in too early so it will be necessary to increase the time lag in order to secure proper integration. It will be seen also that in this case the weight switch 113 is opened early, thereby causing the voltage impressed on the grid of the tube 134 to be less than normal, which in turn, results in a higher than normal resistance in the plate of the tube 134, and this, as explained above, causes an increase in the phase lag. If we know the plate resistance of the tube 134, as a function of the voltage impressed on the grid one can readily calculate the amount of phase lag produced and can also design the constants of the control circuit so that the phase shifts produced will be exactly those required to compensate for the variations in time of the weight striking the ground. These calculations and designs can readily be made by anyone skilled in the analysis of electric circuits. In using this device I connect the leads coming from the detectors to the input terminal 127, and the output terminals 132 and 133 go to the recorder.

It was pointed out above that under conditions commonly encountered in order to compensate for unavoidable variations in the time of generation of the seismic wave we need to introduce phase compensations of as much as twenty milliseconds. The phase shifting device described above is capable of shifting the phase up to half a wave length, and for most satisfactory operation, it is best to operate within the range of about one third wave length. Under most practical conditions the wave lengths encountered will seldom exceed thirty-five or forty milliseconds and they may often be much shorter than this. It follows, therefore, that the simple phase shifting circuit above described will not provide the desired compensation for the more extreme variations in impact time. In order to provide proper compensation for all conditions that may arise I use two or more phase shifting elements in series, in which case the phase shifts of the individual units are cumulative. The designing of such cascaded units can be readily done by anyone skilled in electrical circuit design.

As explained above in reference to Fig. 8 the contact switch 83 is mounted on an adjustable base 105, so that the time of releasing the weight 28 can be varied progressively for the purpose of improving the integration efficiency of successive records. An examination of the circuits and operating sequences above set out will show that if the weight dropping contact 83 be moved, the timing contact 124 must also be moved in the same direction and by the same amount with respect to the rotation of the drum 21 so that in a normal fall, that is, when there exist none of the causes of variation of the time of impact of the weight 28 with the ground, the opening of the contact 113 on the weight switch will occur well within the fifty millisecond (more or less) contact period of the contact 124. In order to accomplish this I prefer to mount the two contacts, 83 and 124 on a common adjustable base, as shown in Fig. 18. Since these two contacts must of necessity be spaced apart in angular relationship about the drum 21 by an amount such that the difference in time of actuation of these contacts will be substantially equal to the time required for the weight to fall from its normal height to the ground, I prefer to mount the contacts 83 and 124 on an adjustable crescent like slide as illustrated at 138 on Fig. 18. The slide 138 moves in a circular grove 139 in the frame 140 supporting the drum 21, and its angular position is adjusted by the screw 107. With this arrangement the timing system is not disturbed by any amount of adjustment of the weight dropping contact 83.

It was mentioned above that the form of the weight 28 is important. One reason for this is illustrated in Fig. 19. Frequently the weight will be dropped on an area where there is considerable difference in the compressibility of the ground under one side of the weight as compared with the other. This condition is often encountered and may be due to such causes as the occurrence of local rocks or other hard formations as at 141, or to the existence of a layer of uncompacted soil 142 that is considerably thicker under one side of the weight than the other. When these conditions exist the weight 28 on falling, will sink deeper on one side than on the other. This gives rise to a rotatory motion about a horizontal axis, as indicated by the arrow 143. The velocity of the weight 28 at the beginning of impact being rather high, there will be a substantial horizontal component of velocity set up in the upper portions of the weight. This tends to cause the weight to skid, and to rotate, in the direction of the horizontal velocity component. If the weight be too high it will be completely overturned. These secondary movements of the weight, not only produce serious secondary impacts but they often disrupt the operating cycle when the weight is overturned. I have found that these troubles can be minimized by so designing the weight 28 that the lateral dimensions are large compared with the height of the center of gravity above the base of the weight. More specifically, I have found that this trouble is eliminated completely if the smallest horizontal dimension of the weight 28, or of its base, is greater than twice the distance of the center of gravity 144 of the weight above its base 145.

An important element of design, from the standpoint of practical operation is illustrated in Fig. 7. When the weight 28 is lifted from the ground and is being hoisted, the truck carrying the weight will usually be moving forward to the next drop location. Due to irregular movements and other causes growing out of rough terrain the weight will often swing violently, particularly in a direction to and from the truck. These oscillations, unless damped, may often set up violent strains in the cable and draw works as the weight approaches the sheave 61. In order to minimize these effects, I provided a damping plate 146. The width of this is preferably somewhat greater than the dimensions of the weight, and extends from a point close to the top of the mast, or other suitable weight support member carried by the truck frame, to within a few inches of the ground. The plate 146 is thin enough to be somewhat flexible, yet stiff enough to exert considerable resistance when struck by the weight. A plate approximately a quarter of an inch in thickness and about six feet wide is satisfactory. Compression springs 147 are provided to yield and cushion impacts from the weight. Rollers 148, preferably composed largely of rubber-like material in order to cushion and absorb shocks, are mounted on the forward edge of the weight 28 so that the impact of the weight with damping plate 146 will always be transmitted through these rollers. The springs 147 should also be damped to minimize rebound, and this can be accomplished in a number of obvious ways. One way is to use rubber pads instead of metal springs, since rubber, while yielding like a spring, absorbs much of the energy of the impact and reduces rebound. I have found this arrangement quite effective in damping the major oscillations of the weight 28 while it is being elevated to the dropping position. I prefer to provide a hinge 149 carrying a portion 150 of the plate 146, which portion is held in a forward position by a spring 151. This lower hinged portion prevents the weight 28 from skidding under the truck frame on being dropped. It will be readily understood from Fig. 7 that when the hinged portion 150 strikes obstructions, such as rocks, shrubs, etc., it will swing back to clear such obstructions and then be returned to its normal position by the spring 151.

The baffle plate 146, described above, effectively takes care of the major oscillations of the weight 28 while it is being lifted, but when the weight reaches the top it will often swing through a considerable angle approximately about the point of suspension of the weight. If these swings are not damped out before the weight is dropped the weight will tend to strike the earth first on one edge or corner, in which case the impact is much less effective in generating a seismic wave than if the weight falls flat. Therefore, in order to avoid delays in dropping the weight it is necessary to provide damping devices that will very quickly bring the weight to rest after it reaches the drop position. Any of many different types of damping devices may be used. In general, any device that yields under pressure, and that absorbs energy while so yielding will produce the effect desired. One that I have found very effective is a dash-pot arrangement shown in principle in Fig. 20. A cylinder 152 is adapted to be mounted to the fixed part of the truck frame as through the lug 153, preferably through articulated joints. This cylinder carries a piston 154, and a piston rod 155. A spring 156 tends to keep the piston pressed against the stop 157. The entire space inside the cylinder is filled with a fluid of suitable viscosity. A small aperture 158, extending through the piston 154 permits fluid to pass slowly from one compartment of the cylinder to the other. If pressure be exerted on the end of the piston rod 155, by the weight 28 the piston will move upward but against considerable resistance due to the unequal pressures on the two sides of the piston 154, caused by the throttling effect of the aperture 158. When the pressure is removed from the piston rod 155, the spring slowly restores the piston to its normal position. In practice I prefer to use four of these damping devices, one near each corner of the weight 28. Two of these dampers are shown schematically in Fig. 21.

Hereinabove, in reference to Fig. 8 it was explained how a brake 72 was automatically applied to the draw works as the weight 28 neared the ground to prevent overshooting of the hoisting drum and resultant fouling of the cable 60. This brake effect is virtually essential for the purposes intended, but in itself is insufficient to fully accomplish the objective of always preventing the fouling of the cable. The reason for this is that since the weight 28 stops almost instantly, it is extremely difficult to provide sufficient brake effect to prevent some overshooting of the hoisting drum. In order to meet this situation I provide a slack take-up device which effectively prevents fouling of the cable 60, even though a certain amount of overshooting of the hoisting drum 57 does occur. There are many types of slack take-up devices that may be used, and a preferred type is illustrated in Fig. 22. Here a sheave 159 is mounted on a pivotally mounted arm 160 which is pivoted to an extension of the hoist frame at 161. A spring 162 tends to pull the sheave 159 into a position out of line with the normal position of the cable 60 which normal position is shown by the dotted line 163. It will be seen that when the weight is being suspended by the cable 60, the cable will maintain almost the position of the dotted line 163, but when the weight 28 strikes the ground, and the drum 57 overshoots appreciably, the moving sheave 159 takes up the slack and avoids fouling of the cable.

I have found that the stability of the weight 28 in operation is substantially increased if, instead of lifting the weight by a single cable as hereinabove shown, I use two cables spaced a substantial distance apart. In this case it is very desirable to mount two equalizing sheaves on the weight so that the weight always tends to seek a horizontal position regardless of unequal stretch in different parts of the cable. This is shown in essence in Fig. 23 where 60, 60 are the two cables running over the two top sheaves 61, 61, and 164, 164 are the two sheaves attached to the weight 28.

While I have described what is at present considered to be the preferred embodiment of my invention, it will be understood, of course, that many modifications may be made therein; and I therefore contemplate by the appended claims to cover all such modifications as fall within the true spirit and scope of my invention.

What I claim as new and desire to secure by Letters Patent of the United States is:

1. The method of geophysical exploration involving a detector station and a plurality of impact stations arranged in mutually spaced-apart relation; said method comprising sequentially producing a plurality of time-consuming actions at respective ones of said impact stations that sequentially subject the earth thereat to a corresponding plurality of seismic shocks, detecting at said detector station the sequentially arriving seismic waves ensuing from said sequential seismic shocks, shifting in accordance with the time intervals of said time-consuming actions the time-phase of the corresponding ones of said detected seismic waves, producing a plurality of individual records from the corresponding ones of said detected seismic waves after said shifting of the time-phase thereof, said individual records containing first substantially in-phase components representative of desirable data and second substantially out-of-phase components representative of undesirable data, and then producing a composite record of said individual records so that said first components in said individual records are substantially reinforced in said composite record and so that said second components in said individual records are substantially attenuated in said composite record.

2. The method of geophysical exploration involving a master station and a slave station arranged in spaced-apart relation; said method comprising transmitting at a first time a start signal from said master station to said slave station, initiating in response to said start signal an action subsequently productive at a second time of an earth shock at said slave station, the time interval of said action being subject to limited variation, transmitting at said second time a shock signal from said slave station to said master station, establishing in accordance with the elapsed time interval between said first time and said second time a corresponding alteration figure, detecting the seismic wave ensuing from said earth shock at said slave station, altering in accordance with said established alteration figure said detected seismic wave, and recording said altered wave to produce a correspondingly altered wave record.

3. In a geophysical exploration system including a master station and a slave station arranged in spaced-apart relation; the combination comprising means for transmitting at a first time a start signal from said master station to said slave station, means responsive to said start signal for initiating an action subsequently productive at a second time of an earth shock at said slave station, the time interval of said action being subject to limited variation, means for transmitting at said second time a shock signal from said slave station to said master station, means for measuring the elapsed time interval between said start signal and said shock signal, means controlled by said measuring means for selectively establishing an alteration figure, means for detecting the seismic wave ensuing from said earth shock at said slave station, means for altering in accordance with said established alteration figure said detected seismic wave, and means for recording said altered seismic wave to produce a correspondingly altered wave record.

4. A mobile vehicle apparatus for use in a geophysical exploration system and comprising a frame, an outwardly projecting boom carried by said frame, a weight, mechanism carried by said frame and selectively operative to lift said weight from the earth into an elevated position adjacent to the outer end of said boom and to release said weight so that it is dropped from its elevated position back onto the earth in order to produce a seismic shock, means for selectively operating said mechanism, and a signal device carried by said weight and operative in response to the impact of said weight with the earth to produce an impact signal.

5. The method set forth in claim 2, wherein said altering of said detected seismic wave consists essentially of shifting the time-phase thereof.

6. The method set forth in claim 2, wherein said action consists essentially of dropping a weight upon the earth from a substantially fixed height thereabove so that said wave is produced as a result of the impact therebetween, and said start and shock signals are of electrical character requiring entirely inconsequential time intervals in the transmission thereof between said stations.

7. The system combination set forth in claim 3, wherein said means for measuring the elapsed time interval between said start signal and said shock signal includes a condenser and switching mechanism for selectively governing the charging of said condenser during said elapsed time interval.

8. The system combination set forth in claim 3, wherein said means controlled by said measuring means for selectively establishing an alteration figure includes an electron-controlled device, and said means for altering in accordance with said established alteration figure said detected seismic wave includes an electric circuit network the impedance of which is selectively governed by said device.

9. The system combination set forth in claim 3, wherein said means for transmitting a start signal from said master station to said slave station includes a timer-controlled switch at said master station, and said means for transmitting a shock signal from said slave station to said master station includes an impact switch at said slave station.

10. The system combination set forth in claim 3, wherein said means for initiating an action subsequently productive of an earth shock at said slave station includes a weight, and mechanism for dropping said weight upon the earth from a substantially fixed height thereabove.

11. The mobile vehicle apparatus set forth in claim 4, wherein said mechanism essentially comprises a winding-reeling drum, an equalizer sheave on said weight, and a flexible cable operatively connected between said drum and said weight through said equalizer sheave.

12. The mobile vehicle apparatus set forth in claim 4, and further comprising damping means carried by the outer end of said boom and cooperating with said weight for minimizing lateral displacement or swinging of said weight in its elevated position.

13. The mobile vehicle apparatus set forth in claim 4, and further comprising a guard carried by said frame below said boom for preventing skidding of said weight under said frame after said weight is dropped onto the earth.

14. The method of geophysical exploration involving a fixed detector station, a recorder station, and a plurality of impact stations; said method comprising sequentially striking the surface of the earth at respective ones of said impact stations with a corresponding plurality of impacts each of a substantially fixed and sufficiently low intensity as to avoid straining beyond its elastic limit any substantial amount of the adjacent earth medium in order to produce a corresponding plurality of substantially identical and sequential seismic shocks at said impact stations, locating successive impact stations at substantial distances from one another to diversify the sub-surface conditions between said impact stations and the fixed detector station, detecting at said detector station the sequentially arriving seismic waves ensuing from said sequential seismic shocks, producing a plurality of individual record waves from the corresponding ones of said detected seismic waves, said individual record waves containing first substantially in-phase components representative of desirable data and second substantially out-of-phase components representative of undesirable data, and then producing a composite record wave of said plurality of individual record waves so that said first components in said individual record waves are substantially reinforced in said composite record wave and so that said second components in said individual record waves are substantially attenuated in said composite record wave.

15. The method set forth in claim 14, wherein said production of said plurality of individual record waves essentially comprises magnetically recording the same upon a corresponding plurality of individual magnetic record channels, and wherein said production of said composite record wave of said plurality of individual record waves essentially comprises electrically transferring simultaneously said plurality of magnetic recordings from said plurality of individual magnetic record channels and recording the resulting composite record wave.

16. The method of geophysical exploration involving a fixed detector station, a recorder station, and a plurality of impact stations; said method comprising sequentially dropping upon the surface of the earth at respective ones of said impact stations the same weight of a fixed predetermined size from substantially the same height above the earth in order to produce a corresponding plurality of substantially identical and sequential seismic shocks at said impact stations, varying the distance between successive impact stations and the fixed detector station a substantial amount to diversify the time phase of the horizontally travelling waves ensuing from said sequential seismic shocks, detecting at said detector station the sequentially arriving seismic waves ensuing from said sequential seismic shocks, producing a plurality of individual record waves from the corresponding ones of said detected seismic waves, said individual record waves containing first substantially in-phase components representative of desirable data and second substantially out-of-phase components representative of undesirable data, and then producing a composite record wave of said plurality of individual record waves so that said first components in said individual record waves are substantially reinforced in said composite record wave and so that said second components in said individual record waves are substantially attenuated in said composite record wave.

17. The method set forth in claim 16, wherein each of said impact stations is spaced from the adjacent impact stations by a distance in the approximate range 25 to 100 feet.

18. The method of geophysical exploration involving a master station and a slave station; said method comprising transmitting a start signal from said master station to said slave station, initiating in response to said start signal an action that subjects the earth to a seismic shock, the time interval of said action between said start signal and said shock being subject to limited variation, establishing a normal time interval for said action, establishing the deviation in the time interval of said action from the said normal time interval, detecting the seismic wave ensuing from said seismic shock, and delaying the recording of the detected seismic wave for a time interval proportional to said established time deviation.

19. The method of geophysical exploration involving a detector station, a recorder station and a plurality of spaced impact stations, comprising: sequentially initiating a plurality of actions at respective ones of said impact stations that sequentially subject the earth to corresponding seismic shocks, detecting at said detector station the sequentially arriving seismic waves resulting from said seismic shocks, sequentially initiating the recording at said recorder station of said detected waves after the initiation of said respective shock producing actions to produce individual record waves, varying the time of the initiation of respective ones of said shock producing actions relative to the initiation of the recording thereof in accordance with variations in distance between the respective impact stations and the detector station to bring said individual record waves into close time coincidence, and then producing a composite record wave from said individual record waves.

20. The method of geophysical exploration involving a detector station and a plurality of impact stations arranged in mutually spaced-apart relation; said method comprising sequentially dropping upon the earth a fixed weight from a substantially fixed height at respective ones of said impact stations so as sequentially to subject the earth thereat to a corresponding plurality of seismic shocks, establishing a normal drop-time interval, measuring the deviation in actual drop-time intervals at respective ones of said impact stations from said normal drop-time interval, detecting at said detector station the sequentially arriving seismic waves ensuing from said sequential seismic shocks at respective ones of said impact stations, delaying the recording of the sequentially detected seismic waves for corresponding time intervals proportional to the deviations in said actual drop-time intervals from said established normal drop-time interval to produce from said detected seismic waves a corresponding plurality of individual records, said individual records containing first substantially in-phase components representative of desirable data and second substantially out-of-phase components representative of undesirable data, and then producing a composite record of said individual records so that said first components in said individual records are substantially reinforced in said composite record and so that said second components in said individual records are substantially attenuated in said composite record.

21. Apparatus for generating seismic waves comprising a mobile support, a weight, means for suspending said weight upon said support at substantially a predetermined height above the surface of the earth, means operative to release said suspended weight in order to effect dropping thereof upon the earth, an impact device carried by said weight and operative in response to the impact thereof upon the earth, and timing means initiated at a predetermined time relative to operation of said releasing means and interrupted by operation of said impact device for detecting the effective time of fall of said weight, said timing means establishing an alteration figure for use in altering in accordance therewith the time phase of the recording of the seismic waves ensuing from the dropping of said weight.

22. Apparatus for generating and recording seismic waves comprising a support, a weight, means for suspending said weight upon said support above the earth, means for releasing said suspended weight in order to effect dropping thereof upon the earth, a detector operative to detect reflected seismic waves ensuing from the dropping of said weight upon the earth, a recorder operative to record the reflected seismic waves, a timer operative to detect the time of impact of said weight upon the earth, a device operative selectively to introduce a delay in the recording of the detected seismic waves by said recorder, means governed by said timer for controlling said device so as selectively to vary the amount of delay introduced by said device in the recording of the detected seismic waves by said recorder, and means for integrating a plurality of the individual record waves recorded by said recorder.

23. A mobile vehicle device for generating seismic waves for use in geophysical exploration comprising a frame, a support carried by said frame, a weight adapted to be suspended from said support, mechanism carried by said frame and selectively operative to lift said weight from the earth into an elevated position of predetermined height and to release said weight whereby upon fall thereof under the influence of gravity said weight will strike the surface of the earth to produce a seismic shock, means for selectively operating said mechanism, a signal device carried by said weight and operative in response to the impact of said weight with the earth to produce an impact signal, and means responsive to said signal device for establishing an alteration figure for altering in accordance therewith the time phase of the recording of seismic waves ensuing from the dropping of said weight.

24. A mobile vehicle device for generating seismic waves for use in geophysical exploration comprising a frame, a support carried by said frame, a weight adapted to be suspended from said support, a winding-reeling mechanism carried by said frame and selectively operative to lift said weight from the earth into an elevated position of predetermined height and to release said weight whereby upon fall thereof under the influence of gravity said weight will strike the surface of the earth to produce a seismic shock, equalizer sheave means on said weight, a flexible cable operatively connected between said winding-reeling mechanism and said weight through said equalizer sheave means, means for selectively operating said mechanism including means to initiate and terminate both winding and reeling of said cable, an impact signal device carried by said weight and operative in response to the impact of said weight upon the earth, and means responsive to said impact signal device for establishing an alteration figure for altering in accordance therewith the time phase of the recording of seismic waves ensuing from the dropping of said weight.

25. A mobile vehicle device for generating seismic waves for use in geophysical exploration comprising a frame, a support carried by said frame, a weight adapted to be suspended from said support, a winding-reeling mechanism carried by said frame and selectively operative to lift said weight from the earth into elevated position of predetermined height and to release said weight whereby upon fall thereof under the influence of gravity said weight will strike the surface of the earth to produce a seismic shock, means carried by said weight and operative to detect the moment of impact of said weight upon the earth, means responsive to said impact detecting means for establishing an alteration signal for altering in accordance therewith the time phase of the recording of seismic waves ensuing from the dropping of said weight, a flexible cable operatively connected between said winding-reeling mechanism and said weight, means for selectively initiating and terminating both winding and reeling of said cable including means carried by said support and operative to limit the upward travel of said weight, and a switch operative only upon failure of said upward travel limiting means to prevent further operation of the winding-reeling mechanism.

26. Apparatus for generating seismic waves comprising a mobile support, a weight, a flexible cable fixed to said weight and arranged to suspend the same upon said support for free lateral movement with respect thereto and at substantially a predetermined height above the surface of the earth, energy absorbing means on said mobile support cooperating with said weight for damping lateral movement thereof incident to motion of said support, means for releasing said cable to effect dropping of said suspended weight upon the earth, a device carried by said weight and operative in response to impact of said weight with the earth to detect the moment of impact, and means responsive to said device for establishing an alteration figure for altering in accordance therewith the time phase of the recording of seismic waves ensuing from the dropping of said weight.

27. Apparatus for generating seismic waves comprising a frame having a support member attached thereto, a weight carried by said support member, means including a flexible cable for hoisting said weight in unguided relation with respect to said support member to substantially a predetermined suspended height above the surface of the earth, whereby said weight is capable of free lateral movement with respect to said support member during hoisting thereof, energy absorbing means attached to said frame extending below said support member and cooperating with said weight for damping lateral movement thereof during hoisting thereof, means for releasing said cable to effect dropping of said suspended weight upon the earth, means carried by said weight and operative to detect the moment of impact of said weight upon the earth, and means responsive to said impact detecting means for establishing an alteration figure for altering in accordance therewith the time phase of the recording of seismic waves ensuing from the dropping of said weight.

28. The apparatus set forth in claim 27, and further comprising means carried by said support member and operative to limit the upward travel of said weight.

References Cited in the file of this patent

UNITED STATES PATENTS

| | | |
|---|---|---|
| 809,242 | Bishop | Jan. 2, 1906 |
| 1,066,469 | Clark | July 8, 1913 |
| 1,874,007 | Heaton | Aug. 30, 1932 |
| 2,018,737 | Owen | Oct. 29, 1935 |
| 2,088,588 | Dudley | Aug. 3, 1937 |
| 2,121,480 | Finn | June 21, 1938 |
| 2,276,423 | Silverman | Mar. 17, 1942 |
| 2,496,706 | Fiedler | Feb. 7, 1950 |
| 2,499,605 | Nicolson | Mar. 7, 1950 |
| 2,524,589 | Becker | Oct. 3, 1950 |
| 2,620,890 | Lee et al. | Dec. 9, 1952 |

OTHER REFERENCES

Jakosky: "Exploration Geophysics," second edition, Trija Publishing Co., Los Angeles, Calif., 1950, pages 856, 857.

Gough: "A New Instrument for Seismic Exploration at Very Short Ranges," Geophysics magazine, vol. 17, No. 2, April 1952, pages 311–316 (complete article on pages 311–321, 330–333).

UNITED STATES PATENT OFFICE
CERTIFICATE OF CORRECTION

Patent No. 2,851,121                                                      September 9, 1958

Burton McCollum

It is hereby certified that error appears in the printed specification of the above numbered patent requiring correction and that the said Letters Patent should read as corrected below.

Column 2, line 22, for "poises" read -- noises --; column 3, line 3, for "devise" read -- device --; column 11, line 75, for "coumn" read -- column --; column 21, line 25, for "seqpentially" read -- sequentially --.

Signed and sealed this 2nd day of December 1958.

(SEAL)
Attest:
KARL H. AXLINE
Attesting Officer

ROBERT C. WATSON
Commissioner of Patents

UNITED STATES PATENT OFFICE
CERTIFICATE OF CORRECTION

Patent No. 2,851,121 September 9, 1958

Burton McCollum

It is hereby certified that error appears in the printed specification of the above numbered patent requiring correction and that the said Letters Patent should read as corrected below.

Column 2, line 22, for "poises" read -- noises --; column 3, line 3, for "devise" read -- device --; column 11, line 75, for "coumn" read -- column --; column 21, line 25, for "seqpentially" read -- sequentially --.

Signed and sealed this 2nd day of December 1958.

(SEAL)
Attest:
KARL H. AXLINE

Attesting Officer

ROBERT C. WATSON
Commissioner of Patents